United States Patent [19]
Arnold

[11] Patent Number: 5,304,790
[45] Date of Patent: Apr. 19, 1994

[54] APPARATUS AND SYSTEM FOR CONTROLLABLY VARYING IMAGE RESOLUTION TO REDUCE DATA OUTPUT

[75] Inventor: Jack Arnold, Costa Mesa, Calif.

[73] Assignee: Irvine Sensors Corporation, Costa Mesa, Calif.

[21] Appl. No.: 956,914

[22] Filed: Oct. 5, 1992

[51] Int. Cl.⁵ .............................................. H01J 40/14
[52] U.S. Cl. .................... 250/208.1; 250/332
[58] Field of Search .................... 250/208.1, 332, 330, 250/334, 339; 244/3.16

[56] References Cited

U.S. PATENT DOCUMENTS 4,670,653  6/1987  McConkle et al. ............... 250/332
4,814,629  3/1989  Arnold ............................. 250/332

Primary Examiner—David C. Nelms
Attorney, Agent, or Firm—John E. Vanderburgh

[57] ABSTRACT

In accordance with the invention a system is described for controllably varying the resolution of an image event to conserve data output by varying the size of the instantaneous IFOV of an array of detectors. The system comprises a multiplicity of individual detectors which produce an electrical signal in response to an image stimulus. The detectors are connected to busing circuitry by a circuit associated with each individual detector and which is in parallel with the circuits from the other detectors. Each parallel circuit includes a switch for making and breaking the parallel circuit to the busing circuit and control means are provided for opening and closing the switches in real time. As the switches are opened and closed the output signals of the detectors are combined into signals representing pixels having various size instantaneous fields of view depending on the number of detectors whose signals are combined. Combining detector output signals reduces the data output and conserves data processing capacity.

11 Claims, 2 Drawing Sheets

APPARATUS AND SYSTEM FOR CONTROLLABLY VARYING IMAGE RESOLUTION TO REDUCE DATA OUTPUT

GOVERNMENT SUPPORT

This invention was made with government support under Contract F 33615-89-C-1111, awarded by the Department of the Air Force. The government has certain rights in the invention.

FIELD OF THE INVENTION

This invention relates to electronic imaging and, more particularly, to apparatus for controllably varying image resolution to significantly conserve data output and data processing requirements.

RELATED APPLICATION

The present invention is related to subject matter disclosed and claimed in common assignee U.S. Pat. No. 4,675,532, issued Jun. 23, 1987, and entitled THE COMBINED STARING AND SCANNING PHOTOMETER SENSING SYSTEM HAVING BOTH TEMPORAL AND SPATIAL FILTERING. That application contains extensive discussion of the advantages of a combined staring and scanning system, which is there referred to as a "dynamic staring" system.

BACKGROUND OF THE INVENTION

The operation of any scanning system requires that the successive radiation signals from a given pixel in the viewed scene be converted into an output signal representing that particular pixel. In a line array system, this may be accomplished by a direct, synchronized transfer and conversion of each pixel input signal to a corresponding output signal available to the observer.

This transfer may require integration of successive signals from a given pixel prior to electronic transfer of the pixel output. The common method used for such integration is the use of a semiconductor charge transfer device (CTD) array, such as a charge-coupled device (CCD) array, or a bucket-brigade (BB) array. Background noise is a substantial problem, however, when employing a two-dimensional focal plane as contrasted to a line scanner in which the signal is proportional to changes in intensity as the scene sweeps across the detector. Many of the prior art difficulties in providing adequate photo-detector signals from a two dimensioned focal plane have been solved by the "Z-technology" developed by the assignee of this application. The term "Z-technology" refers to the fact that a focal plane module, which has circuit carrying layers perpendicular to the focal plane, has a depth dimension Z in addition to the X and Y dimensions of the focal plane.

Maximum image enhancement, such as would be required to observe an image at maximum range, requires the smallest instantaneous field of view (IFOV). The minimum IFOV is equivalent to one pixel which is represented by the area of object space observed by one detector at a given time. Utilizing Z-technology a large number of detectors can be assembled to observe a large search volume comprising a plurality of focal planes, such as would be required in an aircraft scanning and tracking system. Such systems, however, require enormous data processing capabilities which are beyond the capabilities of most, if not all, data processing equipment currently available. Presently available scanning and tracking systems, particularly those using Z-technology, use various methods to compress or reduce the amount and rate of data output in order effect data processing. For example, one such method is the so-called "thresholding" technique in which only those pixels containing targets or target-like objects are passed to the data processor. However, if the thresholding is accomplished with high sensitivity, most of the background noise passes through the filter to the data processor. On the other hand, if threshold sensitivity is reduced small targets become lost in the background clutter.

SUMMARY OF THE INVENTION

In accordance with the present invention there is provided a system for variably controlling the size of the IFOV and consequently the image enhancement by controllably and selectively combining the signal output of the individual detectors into a pixel consisting of various combinations of detectors. In this fashion it becomes possible to form a pixel of the combined output of many detectors in areas in which maximum image enhancement is not a requirement, for example, in areas closer in to the observer as contrasted to areas at maximum range from the observer. Such a combination enlarges the area of the object space covered by the IFOV while reducing somewhat image enhancement. However, covering a larger area of object space with a single IFOV results in a reduction of the signal output to the data processor and the amount of data processing capacity required is substantially reduced. Reducing the area of object space covered by an IFOV improves image enhancement but increases data output since more signals are required for a given search area. As used hereinafter, increasing or enlarging an IFOV means combining detector signals from an increased number of detectors so that the resulting pixel defines an IFOV which covers a larger area of object space. Reducing an IFOV means reducing the number of detector signals in a pixel thus reducing the area of object space covered by the IFOV.

The system of the present invention allows for instantaneous combination of detector signals and for the multiplexing of the various combinations of signals to enlarge and reduce in real time the area of object space observed by the system. Thus the signal from a single detector which represents the smallest IFOV can be read individually for maximum image enhancement and can be stored and combined in real time with signals from other detectors to enlarge the IFOV so that the signal output of several or many detectors can be combined in one pattern and then immediately recombined in a different pattern without loss of data.

In accordance with the invention the system for controllably varying the resolution of an image event to conserve data output by varying the size of the IFOV of an array of detectors comprises a multiplicity of individual detectors which produce an electrical signal in response to an image stimulus. The detectors are connected to busing circuitry by a circuit associated with each individual detector and which is in parallel with the circuits from the other detectors. Each parallel circuit includes a switch for making and breaking the parallel circuit to the busing circuit and control means are provided for opening and closing the switches in real time. As the switches are opened and closed the output signals of the detectors are combined into pixels defining IFOVs having various sizes depending on the number of detectors whose signals are combined. The detector signals are combined by summing in a common busing circuit.

In accordance with the invention the search volume, which is the total volume of space to be observed or scanned by the system, is partitioned with the partition covering the maximum range to be observed or scanned having the smallest IFOV for maximum image enhancement while successively closer partitions have increasingly larger fields of view since maximum image enhancement is not required. However, the IFOV can be reduced with resulting image enhancement in real time should an event of interest occur at close range. Partitioning the search volume by redesigning the IFOV and resultant image enhancement minimizes data output from areas of lesser interest or areas where maximum data output is not required and thus maximizes utilization of data processing capacity. In addition the revisit time, that is the interval of time between observations of a given focal plane can be varied to reduce the data rate output thus further reducing the data processing requirements.

The invention will be more fully understood and appreciated from the following detailed description taken in conjunction with the drawings.

DETAILED DESCRIPTION OF THE INVENTION

The present invention may be employed in any system in which an area of space is scanned or observed for objects or targets and the scanning energy is translated by a detector into electrical signals which are processed and output to an observer. As used herein, the instantaneous signal output of one detector is referred to as a pixel. For maximum image enhancement, i.e. the smallest IFOV, the signal output is processed in pixel increments. However, as will be shown, this places the maximum burden on the data processing equipment and it is preferable combine the signals of groups of detectors to enlarge the IFOV and reduce the data processing burden where maximum image enhancement is not required. Such combined signal outputs are referred to herein as hyperpixels and modules as distinguished from a pixel.

For the purpose of description, the system will be illustrated in connection with an optical system for aircraft which may be utilized to detect and warn against various targets such as, for example, air to ground missiles, other aircraft or the like. In that connection the system illustrated herein incorporates the "dynamic stare" concepts, which are much preferred but not mandatory, in conjunction with the present invention. The "dynamic stare" concept is disclosed in common assignee U.S. Pat. No. 4,675,532 issued Jun. 23, 1987. In addition the system of the present invention incorporates Z-technology which is described and claimed in the following common assignee patents: U.S. Pat. Nos. 4,551,629; 4,555,623; 4,617,160; and 4,672,737. The disclosures of the foregoing patents are incorporated herein as needed for additional understanding.

Figure 1:
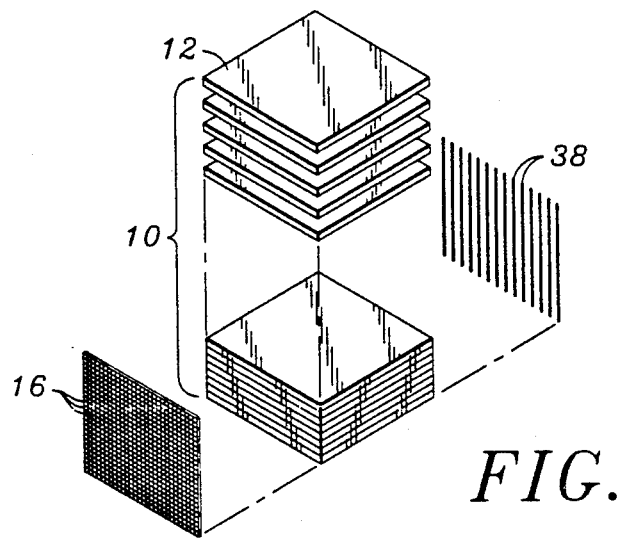
FIG. 1 is an exploded isometric view of a plurality of stacked circuit-carrying chips having a focal plane adapted to carry a two-dimensional array of photo-detectors and having circuitry extending normal to the focal plane of the stack.
Figure 2:
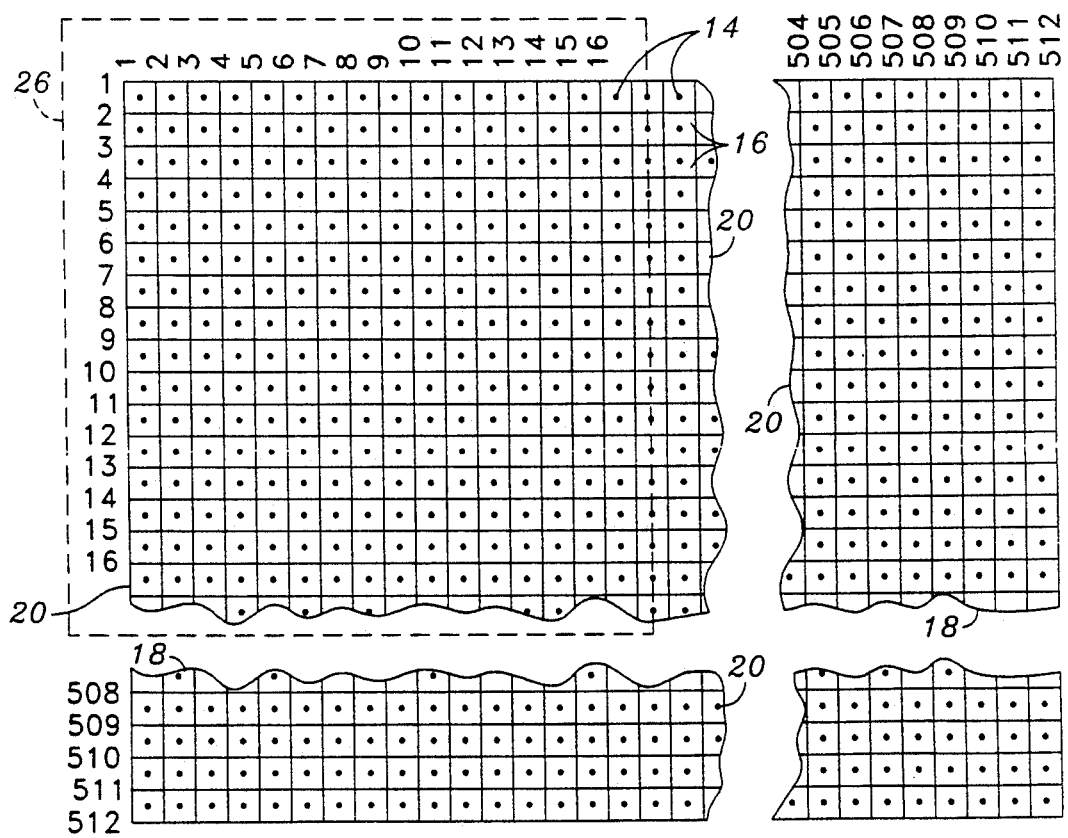
FIG. 2 is a view in enlarged scale and partially broken away for compactness of illustration of the focal plane of the stacked chips of FIG. 1, showing a hyperpixel photo-detector array.

FIGS. 1 and 2 illustrate an integrated stack 10 comprising 256 chips 12 which are flat layers extending in horizontal planes in this embodiment. The use of 256 chips is an arbitrary choice and a greater or lessor number of chips can be employed in the stack 10. Each of the chips 12 has a plurality of focal plane leads 14 which are in conductive engagement with a photo-detector 16. In the illustrative embodiment, the detectors 16 are arranged in 512 vertical columns 18 and 512 rows 20. The total array of detectors 16 on an integrated stack 10 define a module 22.

Figure 3:
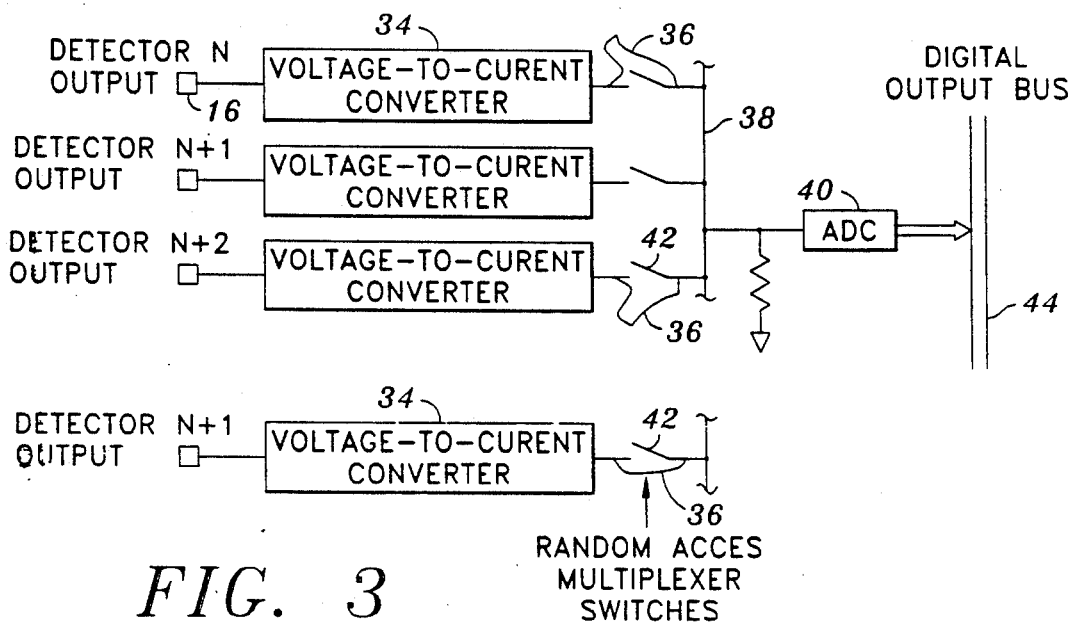
FIG. 3 is a schematic diagram of the parallel circuits for carrying output signals from the detectors to a signal bus in accordance with the present invention.

In the embodiment illustrated in FIGS. 2 and 3, the module 22 contains 512 detectors in each vertical column 18 and 512 detectors in each horizontal row 20 for a total of $2.6 \times 10^5$ detectors ($512 \times 512$). It should be understood, however, that a module may contain more or less detectors depending upon the size and number of the chips 12 forming the integrated stack 10. The stacks 10 are configured for abutment in both the horizontal and vertical direction to provide an assembly of integrated stacks for an even greater array of the detectors 16.

The output of the individual detectors 16 at a given instant of time (pixel) are processed by a suitable data processing system to combine the pixels and form the image which has stimulated the detector 16. Maximum image enhancement is obtained by processing the pixels from each individual detector 16. However for a typical scanning and tracking system of the type illustrated herein the data processing load can be enormous if each data bit were to be processed.

In accordance with the invention, a system is provided in which individual detector pixels are combined in real time to increase the IFOV in those areas where maximum image enhancement is unnecessary and thus substantially reduce or compress the output of data to a level which can be readily processed by presently available data processing equipment. In the embodiment of the invention described herein it is preferred to the signals from the detectors 16 in the array as a block 26 of detectors comprising 16 detectors in a column 18 and 16 detectors in a row 20. The combined signals of the detectors 16 of the block 26 is referred to herein as a hyperpixel and the block of detectors as a hyperpixel array. In the embodiment illustrated, the module 22 is capable of generating 1,024 hyperpixels ($32 \times 32$ hyperpixel arrays/module).

Hyperpixels may be further combined in any desired combination up to a single signal from the total detector array of the module 22. Signals from the module 22 may be combined with that from other modules. Thus, for example, the signal from an array of $10 \times 10$ modules is referred to herein as a sector, and 8 sectors are equivalent to one search sphere covering 90° horizontally and vertically. Table 1 below summarizes the nomenclature and pixel size for the various combination of detector outputs comprising a IFOV (FOV) for the system illustrated herein.

TABLE 1

| IFOV UNIT | No. Detectors | DATA SIZE |
|---|---|---|
| pixel | 1 | 13 bits |
| hyperpixel | $32^2$ | 256 pixels |
| module | $512^2$ | $2.6 \times 10^5$ pixels |
| focal plane | $10^2$ modules | $2.6 \times 10^7$ pixels |
| sector | 6 focal planes | $1.6 \times 10^8$ pixels |
| search sphere | 8 sectors | $1.3 \times 10^9$ pixels |

The foregoing number of detectors and the detector arrays described herein are not critical but are preferred, however, for an aircraft tracking and scanning system such as may be used for target acquisition and missile warning purposes. It will be understood that detector systems utilizing the principles of the present invention may be used for other purposes where the detector arrays may be smaller, particularly when utilizing smaller integrated stacks, and where image acquisition and enhancement is carried out at greater or lesser ranges where the number of detectors required may be more or less. The system is useful for purposes such as, for example, an air traffic control system, high definition television, and other similar systems where data compression and selective image enhancement is required.

As is most clearly shown in FIG. 3, each of the chips 12 in the integrated stack 10 carries circuitry which includes the detector 16, amplifier (not shown), a voltage to current converter 34 and parallel circuits 36 extending from each converter 34 to a signal bus 38. Each of the parallel circuits 36 includes a switch 42 which controllably makes or breaks the circuit. The switches 42 can be synchronized to send a signal from each individual detector 16 or they can be simultaneously closed in any combination of detector signals to create a multiplexed signal at the signal bus 38. The signal bus 38 communicates with an analog to digital converter 40, the output of which is sent to a digital output bus 44 and conveyed to a suitable display device (not shown).

It is highly preferred that there be a signal bus 38 for each hyperpixel block 26 defined on the integrated stack 10. The signal buses are provided on the rear face of the integrated stack, i.e., the face opposite the face carrying the detectors 16. In addition, the analog to digital converters 40, the digital output buses 44 and clock and power buses (not shown) are also carried on the rear face of the integrated stack 10. In the embodiment illustrated there are 1,024 buses arranged in 32 columns of 32 buses each. As mentioned, the output of the signal buses 38 can be summed in any combination at the digital output bus 44.

The circuitry shown and described is illustrative and it will be understood that other well presently available signal enhancing devices may be incorporated in the circuit without departing from the principles of the present invention.

A vital element in the invention are the controllable switches 42 in the parallel circuits 36 which enable the output signals from each of the individual detectors 16 to be summed in any combination at the signal bus 38 for each of the individual hyperpixel blocks 26. The switches 42 in the parallel circuits 36 are preferably MOSFET transistors which are enabled and disabled in response to logic input signals. The logic input signals may be timed in order to periodically enable and disable one or more of the switches 42 in accordance with a predetermined program. In addition the logic input signals may be generated in response to a control means, such as a range finder (not shown) which serves as a controller for enhancing an image depending upon its range. For example, an image sensed at a long range may be enhanced by decreasing the number of switches 42 which are open at any given time thereby reducing the IFOV and substantially increasing the data output. As the object creating the image approaches the observer, the range finder may issue control signals closing all of the switches of the hyperpixel block 26 which reduces the enhancement of the image but substantially compresses the amount of data output from the system.

Example

Figure 4:
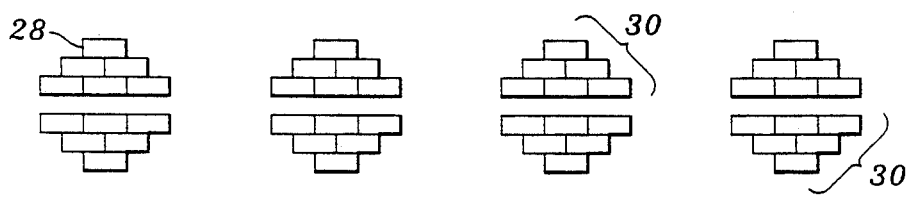
FIG. 4 is a schematic diagram of focal planes arranged as eight sector assemblies to cover the complete 4' sphere.

A typical aircraft system comprising 8 sectors 30 is illustrated in FIG. 4. Each sector 30 consists of 6 focal planes 28. Each sector 30 covers a search area of 90° in azimuth and 90° in elevation. The combined sectors 30 define a $4\pi r^2$ search sphere in which the observer aircraft is at the center.

In this illustration it is assumed that the observer aircraft is at an altitude of 10 km and that the operating altitude of any image, such as ground to air missile is also 10 km. Using the integrated stack 10 of FIGS. 1 and 2, the system is configured to have the smallest instantaneous IFOV for observing images at maximum range and also a revisit time of ⅛th of a second which is the shortest time in order to alarm against a missile which suddenly appears at close range. The system employs dynamic stare temporal filtering as described in U.S. Pat. No. 4,675,532 which comprises temporal filtering taking place off of the focal plane. The temporal filtering consists of three fourth-order filters and 13 bits of dynamic range. Without any data compression and a uniform scan revisit rate of ⅛ second as is conventional for warning systems, such a system would require off focal plane data storage of $1.196 \times 10^{11}$ bits and a data rate requirement of 10.1 GHz.

Figure 5:
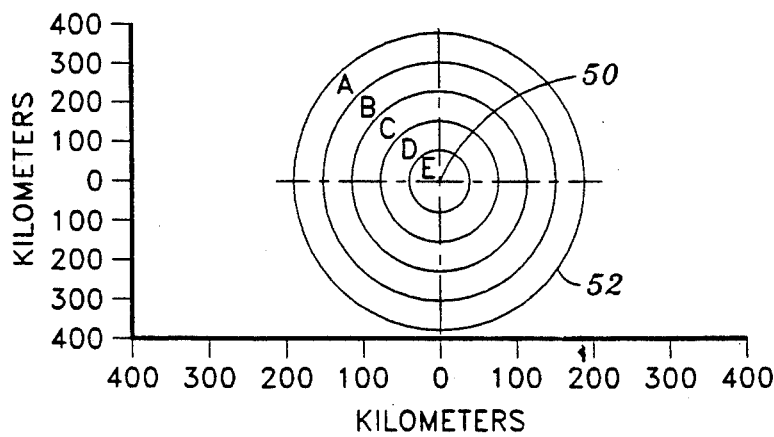
FIG. 5 is a plan view of a search volume partitioned in accordance with the present invention.

FIG. 5 illustrates a search sphere using the selective image enhancement in accordance with the invention to substantially reduce the rate and amount of data output and to substantially reduce data processing requirements. The system illustrated is an aircraft optical scanning and warning system employing Z-technology as described in FIGS. 1-3 and capable of multiplexing the detector signals in the combinations as summarized in table 1. The smallest IFOV is the pixel which represents the angular coverage of one detector unit. FIG. 5 shows an aircraft 50 in the center of a search sphere 52 which surrounds the aircraft. In the example illustrated, there are 5 concentric disk partitions, A-E, with partition A comprising the farthest search range and partition E, the shortest. Size of the detector array and the resultant IFOV increase as the range to the aircraft 50 closes. Accordingly the number of pixels, by definition the number of detectors sending a signal at any given time, is at the maximum for partition A and gradually decreases to partition D. Partition E, the closest to the aircraft has an IFOV containing an increased number of pixels over that of partition D to ensure that the image is significantly enhanced over any background noise close to the aircraft. The revisit rates gradually decrease beginning from partition A to partition E which requires the shortest revisit period since reaction time is the shortest for partition E.

Each disk region is a region of constant IFOV and revisit time. Each IFOV is chosen to allow clutter limited detection out of the maximum range of the region. Revisit times are likewise chosen to give adequate warning at the range covered. Partitioning the search volume in this way provides more efficient coverage in terms of pixel count and data rate. Table 2 summarizes the data output and revisit times for a search pattern for the system described with no data compression and the search pattern partitioned to reduce the data output in accordance with the invention as illustrated in FIG. 5. The total number of pixels was determined by the search conditions, i.e., the altitude of the aircraft, the operating capabilities of probable targets, the ranges to be searched and the angle from the aircraft to the surface at the various search ranges.

TABLE 2

| SYSTEM | Total Pixels | Revisit Rate (sec) | Data Output (Hz) | Bits Stored |
|---|---|---|---|---|
| Conventional System | $1.26 \times 10^9$ | 0.125 | $1.1 \times 10^{10}$ | $1.96 \times 10^{11}$ |
| Partitioned System | | | | |
| Disk A | $4.1 \times 10^4$ | 2.0 | $2.1 \times 10^4$ | $6.4 \times 10^6$ |
| Disk B | $1 \times 10^4$ | 1.0 | $1.0 \times 10^4$ | $1.6 \times 10^6$ |
| Disk C | $5.3 \times 10^3$ | 0.5 | $1.1 \times 10^4$ | $0.8 \times 10^6$ |
| Disk D | $2.4 \times 10^3$ | 0.25 | $0.9 \times 10^4$ | $0.4 \times 10^6$ |
| Disk E | $4.3 \times 10^3$ | 0.125 | $0.4 \times 10^4$ | $0.7 \times 10^6$ |
| Total | $6.3 \times 10^4$ | | $8.5 \times 10^4$ | $9.82 \times 10^6$ |

As can be seen from Table 2, the pixel count is reduced from $1.26 \times 10^9$ to $6.31 \times 10^7$ pixels. This provides a reduction in off plane storage by a factor of 20. Also, the composite data rate, as compared to the straight forward system, is reduced from 10.1 GHz to 85.1 MHz, a reduction by a factor of almost 120. In those areas where the long range disk regions overlie the short range sphere, the pixels are sequentially read out as large hyperpixels, then smaller long range cells. The design of the integrated stack and the parallel circuits and the switching provide for sequential readout of the multiplexed signals as described in connection with FIGS. 1-3.

From the foregoing, it will be seen that the chip architecture and circuitry permits sequential multiplexing of signals from individual and groups of detectors. This in turn permits areas of a search sphere to be partitioned to minimize data and data rate output in areas where maximum image enhancement and/or revisit time are not required. The pixel size and revisit rates for the various partitions illustrated in FIG. 5 are a matter of choice depending on the requirements of the search and it will be understood that for many applications the pixel size and revisit rates may even be reduced more than as set forth in the illustration.

The invention has been described with reference to the illustrated and presently preferred embodiment. It is not intended that the invention be unduly limited by this disclosure of the presently preferred embodiment. Instead, it is intended that the invention be defined, by the means and their obvious equivalents, set forth in the following claims.

Having described the invention, I claim:

1. A system for controllably varying the resolution of a sequence of image events to conserve data output by varying the size of the instantaneous field of view (IFOV) comprising:
    a) a multiplicity of detectors, each producing an electrical signal in response to an external stimulus;
    b) busing circuitry for receiving individual and combined signals from said detectors;
    c) a circuit connecting each of said detectors in parallel to said busing circuitry;
    d) switching means in each of said circuits for making and breaking said circuit between said detector and said busing circuitry; and
    e) logic and control means for said switching means to open and complete said parallel circuits by opening and closing said switches in a desired combination and sequence;
    whereby signals from said detectors are combined at said busing circuitry to controllably enlarge and decrease the IFOV depending upon the number of detector signals which are combined.

2. The system of claim 1 wherein said detectors are disposed in an array of vertical columns and horizontal rows on one vertical face of an integrated stack of circuit carrying chips and said busing circuitry is disposed on the opposite vertical face of said integrated stack, said array of detectors being organized into groups, each group containing number of detectors less than the total number of detectors in the array.

3. The system of claim 2 wherein said busing circuitry comprises a signal bus connected to the parallel circuits of each group of detectors.

4. The system of claim 2 wherein each group of detectors comprises a rectangular array consisting of $16 \times 16$ detectors and the combined signal output thereof comprises an IFOV defined by a hyperpixel.

5. The system of claim 2 wherein the combined signal output of the entire array of detectors on said integrated stack comprises an IFOV consisting of a module.

6. The system of claim 2 wherein the signal output of a plurality of said integrated stacks are combined and the combined signal thereof comprises an IFOV consisting of a focal plane.

7. The system of claim 6 wherein the signal outputs of 100 integrated stacks are combined to form said focal plane pixel.

8. The system of claim 7 wherein the signal outputs of six focal planes are combined to form an IFOV defined by a sector pixel.

9. The system of claim 8 wherein the each sector IFOV covers an area of object space of 90° in elevation and 90° in azimuth.

10. The system of claim 9 wherein eight of said sectors comprise a search sphere.

11. The system of claim 10 wherein said search sphere is partitioned into a series of concentric disks of decreasing radius from said observer, said disk having the greatest radius comprising the smallest IFOV and the detector signal outputs being combined to define IFOVs covering larger areas of object space as the radius of the disk decreases whereby the area of search furthest from the observer has maximum image enhancement and maximum data output and image enhancement and resultant data output decreases as the distance to the observer decreases.

* * * * *